UNITED STATES PATENT OFFICE.

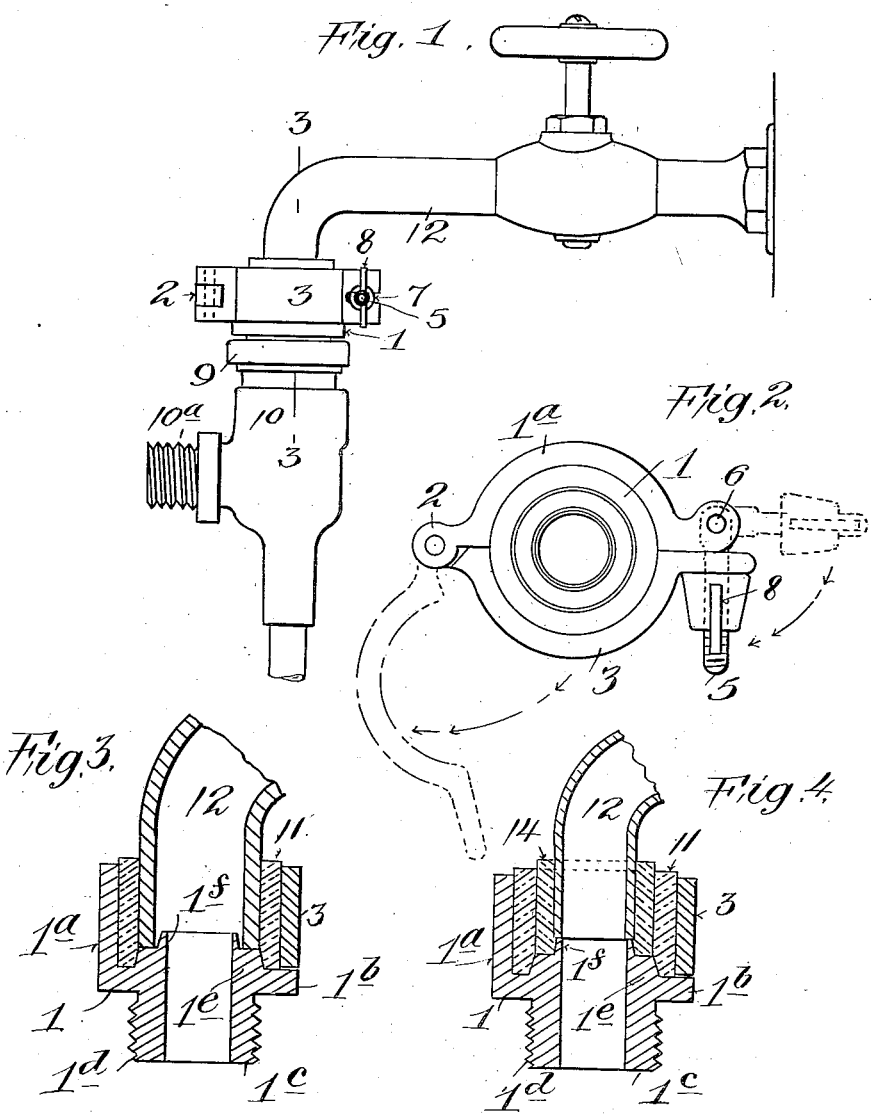

BENJAMIN F. SHAPRO, OF SAN FRANCISCO, CALIFORNIA.

CONNECTION FOR WATER DISTRIBUTION.

1,040,039.  Specification of Letters Patent.  Patented Oct. 1, 1912.

Application filed August 31, 1911. Serial No. 646,961.

*To all whom it may concern:*

Be it known that I, BENJAMIN F. SHAPRO, a citizen of the United States, and resident of San Francisco, in the county of San Francisco and State of California, have invented certain new and useful Improvements in Connections for Water Distribution, of which the following is a specification.

The object of my invention is to provide improved means for readily attaching water conveying devices to faucets and analogous water supply fittings, my invention being particularly applicable for connecting to the faucet a casing or head used for the flow of water to produce exhaust in a hose used in vacuum cleaners.

My invention comprises novel details of improvement and combinations of parts that will be more fully hereinafter set forth and then pointed out in the claims.

Reference is to be had to the accompanying drawings forming part hereof, wherein, Figure 1 is a side view illustrating my improvements applied to a faucet; Fig. 2 is a plan view of my improvements detached from the faucet; Fig. 3 is a section on the line 3, 3, in Fig. 1, and Fig. 4 is a view similar to Fig. 3 showing provision for applying my improvements upon the outlet of a faucet that is smaller than that shown in Fig. 3.

Similar numerals of reference indicate corresponding parts in the several views.

My improved connection comprises a base plate 1 from which rises a curved wall $1^a$ to which is hinged at 2 a curved clamping member 3, which when closed overlies portion $1^b$ of base 1 that is located on the side opposite wall $1^a$. The clamping member 3 is adapted to be detachably held at its free end to the wall $1^a$, for which purpose I have shown a screw 5 pivoted at 6 upon the end of wall $1^a$ opposite the pivot or hinge 2, the screw 5 being adapted to pass through a slot 7 in the end of the swinging clamping member 3, nut 8 on screw 5 serving to hold the clamping member 3 closed in connection with wall $1^a$. From base 1 extends a tubular projection $1^c$ shown provided with threads $1^d$ to receive a coupling nut 9 rotatively mounted in a wellknown manner upon the upper end of head or casing 10, whereby the latter may be readily attached to the projection $1^c$. The head or casing 10 may be of any wellknown or suitable construction adapted to cause exhaust from a hose connected with the threaded extension $10^a$ as water flows through said head or casing in a wellknown manner.

At 11 is a ring or hose section of flexible material, preferably rubber hose, adapted to fit between the clamping members $1^a$ and 3, and to receive the end of faucet 12, whereby my improved connection may be readily secured upon the end of the faucet and as readily removed. I have shown an annular hub $1^e$ rising from base 1 and slightly tapered on its exterior to enter ring or hose section 11, the extreme end of the ring or hose 11 being cut smooth to fit against base 1 whereby the ring or hose section is clamped upon the end of the faucet by the clamping members $1^a$ and 3, and a water-tight connection may be made.

In order that my improved connection may be readily applied to faucets of varying sizes, I provide an inner ring or hose section 14 adapted to fit snugly within ring or hose section 11, and to receive the end of faucet 12, as in Fig. 4. I have also shown an annular boss $1^f$ extending inwardly from the hub $1^e$ and adapted to fit within the smaller ring or hose section 14, the adjacent end of the boss fitting against the smooth outer end of hub $1^e$. When the parts are assembled, as in Fig. 4, and the clamping members $1^a$ and 3 are screwed together tightly, the ring or hose sections 11 and 14 will be compressed together, and the inner ring or hose section 14 will clamp tightly on the faucet and on the boss $1^f$. This arrangement permits the user to apply the connection to the larger faucet 12 by removing the inner ring or hose section 14, or to apply the connection to the smaller faucet 12 by utilizing the inner ring or hose section 14, as may be required. By means of my improvements the head or casing 10 may be readily applied to and removed from a faucet that is not provided with threads at its ends to receive a screw threaded coupling, a tight fitting of the connection upon a faucet being readily effected, and the connection may be readily applied to the faucet and removed therefrom.

While I have described my improvements as applicable for connecting the head or casing 10 with the faucet, it will be understood that a hose may be connected with the threaded extension $1^c$, whereby ready connection of the hose with the faucet may be made.

Having now described my invention what I claim is:—

1. The combination of a base provided with a wall on one side, and a tubular projection on the opposite side, a clamping member hinged at one end to the wall and adapted to pass over the base, means for detachably clamping said wall and clamping member together, said base having a laterally projecting hub between the wall and clamping member, and a tubular resilient ring receiving said hub and fitted between said wall and clamping member.

2. The combination of a base provided with a wall on one side, and a tubular projection on the opposite side, a clamping member hinged at one end to the wall and adapted to pass over the base, means for detachably clamping said wall and clamping member together, said base having a laterally projecting hub, a tubular resilient ring receiving said hub and fitted between said wall and clamping member, said hub being provided with a flat inner end and having a boss of less diameter than the hub projecting laterally therefrom, and a flexible ring fitted within the outer ring and receiving said boss, said hub and boss being between the wall and clamping member.

Signed at New York city, in the county of New York, and State of New York, this 30 day of August, A. D. 1911.

BENJAMIN F. SHAPRO.

Witnesses:
Max M. Kotzen,
T. F. Bourne.